United States Patent
Yoneda

[11] Patent Number: 5,937,989
[45] Date of Patent: Aug. 17, 1999

[54] CLUTCH DISK ASSEMBLY HAVING CUSHIONING PLATES AND PAIRED FRICTION PADS RIVETED TOGETHER

[75] Inventor: Kazuhiko Yoneda, Neyagawa, Japan

[73] Assignee: Exedy Corporation, Neyagawa, Japan

[21] Appl. No.: 09/129,914

[22] Filed: Aug. 6, 1998

Related U.S. Application Data

[62] Division of application No. 08/800,415, Feb. 14, 1997, Pat. No. 5,857,551.

[30] Foreign Application Priority Data

Mar. 19, 1996 [JP] Japan .................................. 8-062588
Apr. 23, 1996 [JP] Japan .................................. 8-101390

[51] Int. Cl.$^6$ .............................. F16D 69/04; F16D 13/64
[52] U.S. Cl. .................................. 192/214.1; 192/107 C; 192/107 M
[58] Field of Search .......................... 192/107 C, 107 M, 192/52.6, 214.1

[56] References Cited

U.S. PATENT DOCUMENTS

| | | | |
|---|---|---|---|
| 2,101,410 | 12/1937 | Nutt et al. ........................... | 192/52.6 X |
| 2,888,122 | 5/1959 | Garmager ............................ | 192/107 C |
| 3,241,644 | 3/1966 | Ridenour ............................. | 192/107 C |
| 3,587,803 | 6/1971 | Sugiura et al. ..................... | 192/107 C |
| 3,696,902 | 10/1972 | Dantele ............................... | 192/107 C |
| 4,422,539 | 12/1983 | Werner ................................ | 12/107 C |
| 4,516,672 | 5/1985 | Caray ................................. | 192/56.2 X |
| 4,697,683 | 10/1987 | Graton et al. ...................... | 192/107 C |
| 5,048,659 | 9/1991 | Tojima ............................... | 192/107 C |
| 5,137,133 | 8/1992 | Graton et al. ...................... | 192/107 C |
| 5,452,783 | 9/1995 | De Briel et al. .................... | 192/107 C |

*Primary Examiner*—Richard M. Lorence
*Attorney, Agent, or Firm*—Shinjyu An Intellectual Property Firm

[57] ABSTRACT

In a first embodiment, a friction engagement portion 3 of clutch disk assembly includes a driven plate 20 fixed to a clutch plate 5, a cushioning plate 21, first and second sintered alloy pads 22 and 23, and rivets 32. The cushioning plate 21 has a corrugated form allowing elastic deformation. The first sintered alloy pad 22 is arranged at the cushioning plate 21. The second sintered alloy pad 23 is fixed to the driven plate 20 having an outer peripheral edge bent for fixing the second sintered alloy pad 23. The rivet 32 has an end engaged with the second sintered alloy pad 23, is axially movable, and has the other end for fixing the cushioning plate 21 and the first sintered alloy pad 22. In a second embodiment, a pair of first and second cushioning plates 120 and 121 are opposed to each other at an outer peripheral portion of the clutch disk assembly. Sintered alloy pads 122 and 123 fixed at outer surfaces of the first and second cushioning plates 120 and 121. The first and second cushioning plates 120 and 121 are corrugated to provide cushioning characteristics having two stages.

7 Claims, 7 Drawing Sheets

CLUTCH DISK ASSEMBLY HAVING CUSHIONING PLATES AND PAIRED FRICTION PADS RIVETED TOGETHER

This application is a division of application Ser. No. 08/800,415 filed Feb. 14, 1997 now U.S. Pat. No. 5,857,551.

BACKGROUND OF THE INVENTION

A. Field of the Invention

The present invention relates to a friction engagement portion of a clutch disk assembly having friction pads made of sintered alloy.

B. Description of the Related Art

In general, it is desirable for a clutch disk assembly to have a generally large torque transmitting capacity. A facing of a friction engagement portion of the clutch disk is generally made of glass fiber, resin, rubber or the like. However, the facing made of such a material may not have a sufficiently large torque transmitting capacity.

In order to ensure a large torque capacity, some clutch disks use sintered bodies (which will be referred to as "sintered alloy pads") made of a mixture of ceramic powder and metal powder. These clutch disks are generally produced by heating (under pressure in some cases) ceramic powder and metal powder disposed on a copper-plated core plate of iron.

In the clutch disk assembly having such a conventional sintered alloy pad, the clutch disk (friction member) does not have a cushioning effect, and thus causes a large shock or jolt in an automobile as the clutch is being engaged.

In view of the above, in such a clutch disk structure, there may be employed that a pair of plate members that include corrugated portions which form convex surfaces. Spaces are defined between the plate members due to the convex surfaces. Separate sintered alloy pads are fixed to each of the plate members by rivets, one set of rivets extending through one plate member and another set of rivets extending through the other plate member. Consequently, the rivets extend through surfaces of each plate member adjacent to one another. According to this structure, the convex surfaces of the plate members bend to exhibit a cushioning effect in the clutch engaging operation.

However, the adjacent surfaces of the paired plate members having rivets extending therethrough are such that the degree of cushioning effect is restricted by contact between the heads of the rivets and the adjacent surface of the adjacent plate member. Even if positions of the rivet heads are spaced apart to avoid mutual contact or interference, the rivet heads are unavoidably brought into contact with the adjacent surface of the plate members, so that the degree of cushioning effect is restricted. Since only the rivet heads are brought into contact with the adjacent surface of one of the plate member in the cushioning operation, contact pressure is localized and is not uniformly on the sintered alloy pads, so that local wearing occurs in the area where the rivet heads make contact.

Clutch disk assemblies used in a passenger car may also include friction engagement portions which are made of an organic material such as glass fiber, resin, rubber or the like, in addition to the type described above having sintered materials. In the clutch disk using organic friction members, a cushioning plate is disposed between paired friction facings opposed to each other, so that the cushioning plate reduces a shock in the clutch engaging operation.

A problem with the conventional clutch disk assembly having a cushioning plate is that the cushioning characteristics of the assembly have a generally linear form. It is difficult to achieve intended cushioning characteristics in spite of the provision of the cushioning plates. For example, if the cushioning characteristics are set principally for suppressing shudder, then noises cannot be adequately prevented. Alternatively, if the cushioning characteristics are set principally for suppressing noises, shudder cannot be adequately suppressed.

In particularly, it desirable to overcome these problems in the clutch disk using the sintered alloy pads, because the clutch disk using sintered alloy pads produces both shudder and unwanted noises during usage.

SUMMARY OF THE INVENTION

One object of the invention is to provide a friction engagement portion of a clutch disk with sintered alloy pads and provide a sufficiently large degree of cushioning when the clutch disk is being engaged and disengaged by a clutch engaging apparatus.

Another object of the invention is to reduce or eliminate wear often caused by contact between rivets and other portions of a clutch disk in response to cushioning.

An object of the invention is to provide a means for selective setting of various cushioning characteristics in a clutch disk assembly using sintered alloy pads.

In accordance with one aspect of the present invention, a friction engagement portion of a clutch disk assembly fixed to an outer peripheral portion of the clutch disk assembly includes a driven plate attachable to an input portion of a clutch disk assembly and a cushioning plate disposed adjacent to a first surface of the driven plate. The cushioning plate is formed with a corrugated form such that at least a portion of the cushioning plate is biased away from contact with the driven plate, the corrugated form allowing for elastic deformation of the cushioning plate in response to axially oriented forces. A first sintered alloy pad is disposed on a surface of the cushioning plate remote from the driven plate and a second sintered alloy pad is attached to a second surface of the driven plate, the driven plate formed with an outer peripheral edge bent for engagement with a portion of the second sintered alloy pad. The friction engagement portion further includes a carrying member formed with an end engaged with the second sintered alloy pad, the carrying member being displaceable in a direction of the elastic deformation of the cushioning plate, and having another end fixing the cushioning plate and the first sintered alloy pad.

Preferably, the cushioning plate has an inner peripheral portion fixed together with the driven plate to the input portion of the clutch disk assembly, and has a radial outer portion thereof includes the corrugated form.

Preferably, the driven plate is provided at its inner peripheral portion with a partially cut and bent portion that extends in an axial direction, the cut and bent portion shaped to retain the inner peripheral portion of the second sintered alloy pad against radial movement.

Preferably, the outer peripheral edge is bent for engagement with a portion of the second sintered alloy pad extends axially for contact with radially extending sides of the second sintered alloy pad for restraining the second sintered alloy pad against circumferential movement.

Preferably, the carrying member is a rivet which extends through: an aperture formed in the first sintered alloy pad; an aperture formed in the cushioning plate; an aperture formed in the driven plate; and an aperture formed in the second sintered alloy pad. Further, the rivet is formed with a first head which engages the first sintered pad and the cushioning plate such that said rivet is confined for constant engagement with the first sintered alloy pad and undergoes axial movement with the first sintered alloy pad and the cushioning plate, The rivet is also formed with a second head in contact with the second sintered alloy pad such that the rivet is configured to undergo limited axial displacement with respect to the driven plate and the second sintered alloy pad.

In accordance with another aspect of the present invention, a friction engagement portion of a clutch disk assembly is fixed to an outer peripheral portion of a clutch disk assembly and includes first and second plate members opposed to each other and arranged at an outer peripheral portion of a clutch disk assembly. Friction surface members are fixed at outer surfaces of the first and second plate members. Futher, at least one of the first and second plate members is corrugated to provide cushioning characteristics having multiple stages.

Preferably, the first plate member is provided at radially inner and outer peripheral portions with inner and outer first bent portions which engage the second plate, and the first plate member is also provided at the inner and outer peripheral portions with inner and outer second bent portions which extend toward the second plate and having axial lengths shorter than the first bent portions such that the second bent portions are spaced apart from the second plate and the second bent portions engage the second plate in response to limited axial movement toward the second plate and in response to further axial movement toward the second plate the second bent portions undergo elastic deformation.

Preferably, the second plate member is provided at inner and outer peripheral portions thereof with bent portions corresponding to the bent portions of the first plate member.

Preferably, the friction surface member is made of sintered metal material.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
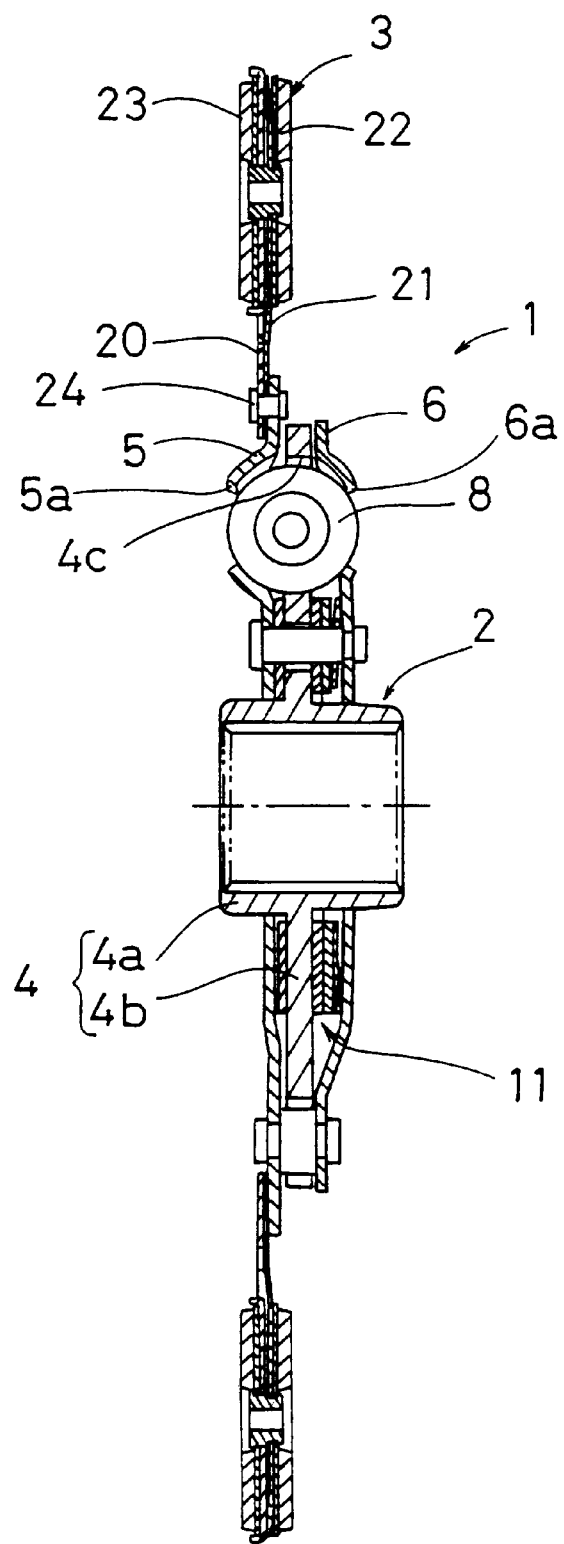
FIG. 1 is a cross sectional side view of a structure of a clutch disk assembly in accordance with one embodiment of the present invention.
Figure 2:
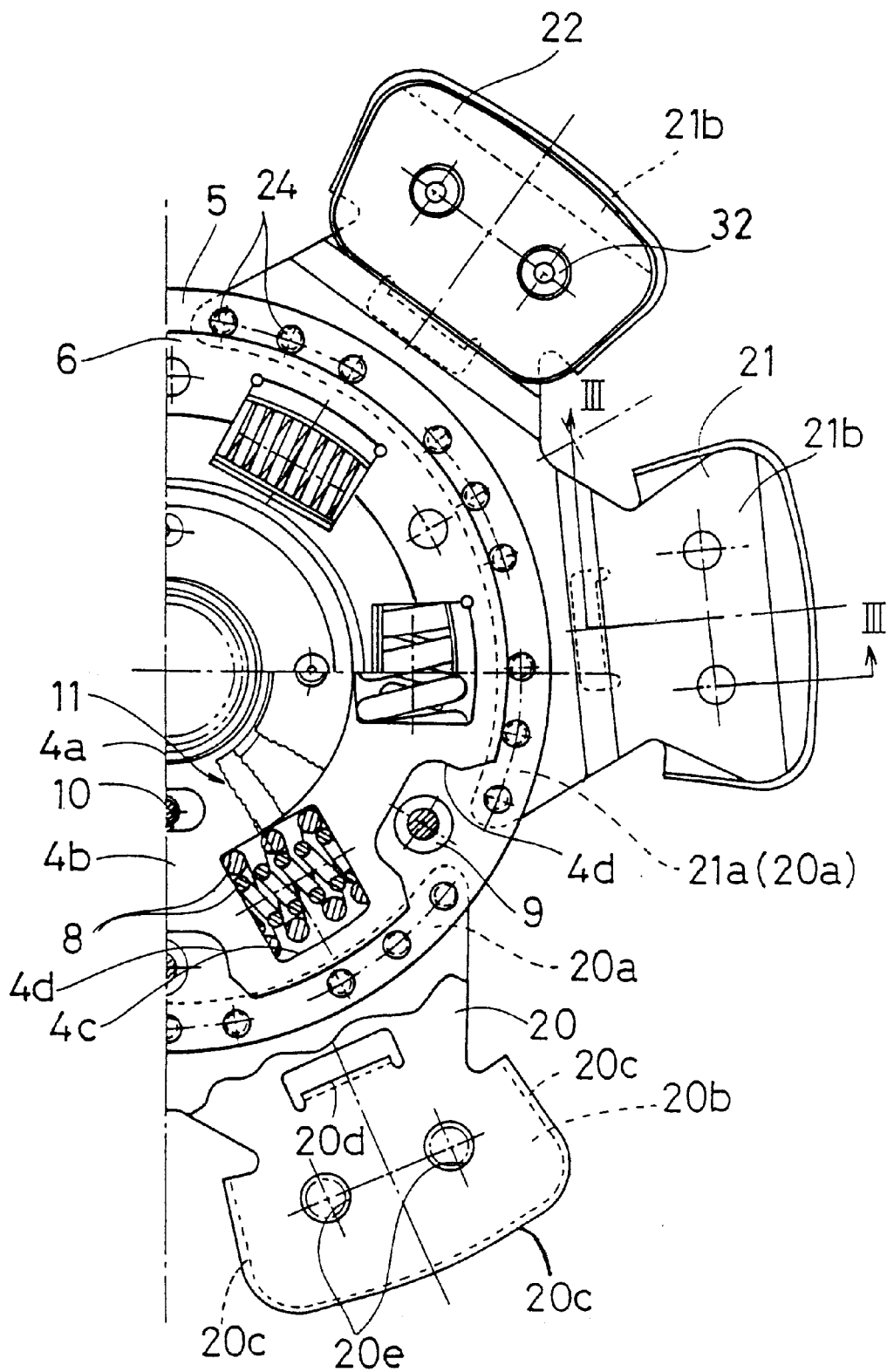
FIG. 2 is a fragmentary, part cross sectional, part elevational end view of the clutch disk assembly shown in FIG. 1.

As shown in FIGS. 1 and 2, a clutch disk assembly 1 of a first embodiment of the invention includes a main body 2 and a friction engagement portion 3.

At the center of the main body 2, there is arranged a spline hub 4 coupled to a shaft (not shown) of a transmission. The spline hub 4 has a boss 4a and a flange 4b extending radially from the boss 4a. Input plates, i.e., a clutch plate 5 and a retaining plate 6 are arranged at opposite sides of the flange 4b. The clutch and retaining plates 5 and 6 are substantially annular, and are rotatably engaged with the outer periphery of the boss 4a. The flange 4b is provided at its radially middle portion with a plurality of windows 4c, in which torsion springs 8 are arranged, respectively. The torsion springs 8 elastically connects the clutch and retaining plates 5 and 6 to the spline hub 4 in the circumferential direction.

The flange 4b is provided at its outer peripheral portion with recesses 4d which are circumferentially equally spaced from each other and each have a predetermined circumferential width. A stop pin 9 extends axially through each recess 4d. The stop pins 9 and stud pins 10 arranged at radially inner positions axially and circumferentially fix the clutch and retaining plates 5 and 6 together. A space is formed between each stop pin 9 and the edge of the corresponding recess 4d, so that the clutch and retaining plates 5 and 6 can rotate relatively to the spline hub 4 through a predetermined angle until the stop pins 9 are brought into contact with the edges of the recesses 4d.

A hysteresis torque generating mechanism 11 for generating a hysteresis torque is arranged between the inner peripheral portion of the flange 4b and each of the clutch and retaining plates 5 and 6. The hysteresis torque generating mechanism 11 is formed of annular friction washers, annular friction plates and a conical spring.

The clutch and retaining plates 5 and 6 are provided at positions corresponding to the windows 4c of the flange 4b with cut and bent portions 5a and 6a which are bent and projected axially outward, respectively. The cut and bent portions 5a and 6a support the torsion springs 8 in the windows 4c.

The friction engagement portion 3 is arranged radially outside the clutch plate 5, and includes three driven plates 20, cushioning plates 21 and a plurality of sintered alloy pads 22 and 23, which are fixed to the driven plates 20 and cushioning plates 21, respectively.

The driven plates 20 are circumferentially equally spaced from one another. Likewise, the cushioning plates 21 are three in number and are circumferentially equally spaced from each other. These plates 20 and 21 are fixed at their inner peripheral portions to the outer peripheral portion of the clutch plate 5 by rivets 24. These plates 20 and 21 have the substantially same configurations, and have fixed portions 20a and 21a fixed to the outer peripheral portion of the clutch plate 5 and pad carrying portions 20b and 21b, which extend radially outward from the fixed portions 20a and 21a in a divided form, respectively.

Figure 3:
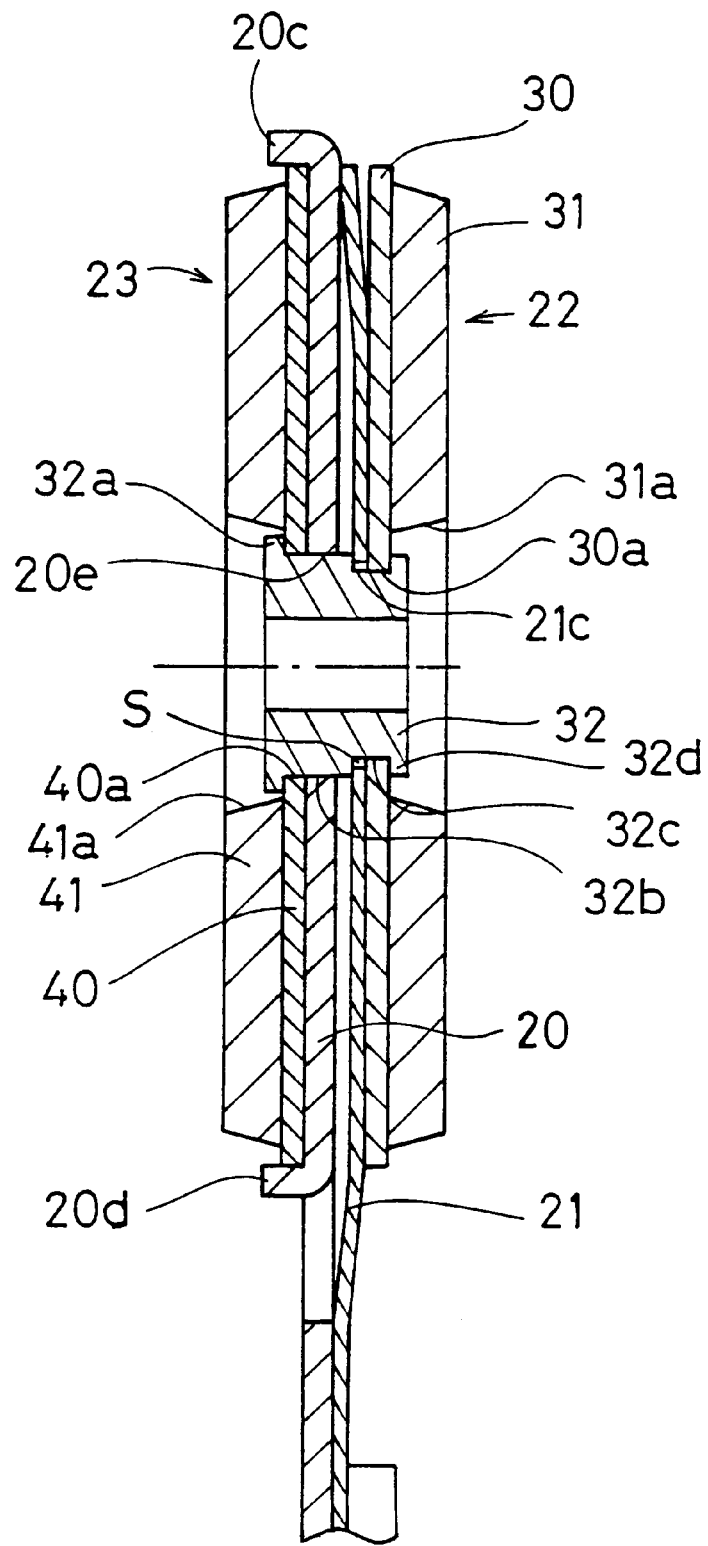
FIG. 3 is a fragmentary cross sectional view of a portion of FIG. 1, on an enlarged scale, showing details of the first embodiment of the present invention.

As shown in FIGS. 2 and 3, each driven plate 20 has bent portions 20c located at the outer edge of the pad carrying portions 20b and more specifically at the outermost edges and side edges thereof. Each driven plate 20 is also provided at its inner periphery with a bent portion 20d formed of a cut and bent portion of the driven plate 20. The second sintered alloy pads 23 are partially fixed to the driven plates 20 by caulking these bent portions 20c and 20d. Specifically, the bent portions 20c and 20d prevent radial or circumferential movement of the pads 23.

Each cushioning plate 21 is formed of a corrugated plate member as shown in FIG. 2 and FIG. 3 which shows, on an enlarged scale, a portion in FIG. 1.

Each first sintered alloy pad 22 is fixed to the pad carrying portion of the cushioning plate 21 by rivets 32. As shown on an enlarged scale in FIG. 3, each first sintered alloy pad 22 is formed of a core plate 30 and a sintered alloy member 31 formed on the core plate 30 by sintering. The core plate 30 and the sintered alloy member 31 are provided with apertures 30a and 31a for fixing rivets 32.

Each second sintered alloy pad 23 is fixed to the pad carrying portion 20b of the driven plate 20, and has a core plate 40 and a sintered alloy member 41 similarly to the first sintered alloy pad 22. The core plate 40 and the sintered alloy member 41 are provided with apertures 40a and 41a, respectively.

Each driven plate 20 is provided with rivet apertures 20e, through which rivets 32 are inserted. A head 32a at one end of each rivet 32 is engaged with the core plate 40 of the second sintered alloy pad 23. The rivet 32 has a shank portion 32b of a large diameter, which is fitted into the aperture 40a of the core plate 40 and the rivet aperture 20e of the driven plate 20. The rivet 32 is axially movable with respect to the driven plate 21. The rivet 32 also has a shank portion 32c of a small diameter, which is fitted into the aperture 21c of the cushioning plate 21 and the aperture 30a of the core plate 30. A head 32d at the other end of the rivet 32 is caulked, so that the cushioning plate 21 and the core plate 30 are fixed between the large shank portion 32b and the head 32d.

In this manner, the cushioning plate 21 is fixed at its inner peripheral portion to the driven plate 20 and the clutch plate 5 by the rivets 24, and is also fixed at its radially middle portion to the driven plate 20 by the rivets 32.

A space S is ensured between the outer periphery of the small shank portion 32c of the rivet 32 and the inner periphery of the aperture 21c of the cushioning plate 21, so that the cushioning plate 21 can move radially with respect to the driven plate 20. No space is left around the small shank portion 32c of the rivet 32 fitted into the aperture 30a of the core plate 30. In other words, the shank portions 32c of the rivet 32 snugly fit into the apertures 30a, but the shank portions 32c are loosely fit into the aperture 21c to allow for radial movement of the cushioning plate 21.

In the clutch disk assembly of the above structure, since the cushioning plate 21 is disposed between the first and second sintered alloy pads 22 and 23, the cushioning plate 21 elastically deforms when the sintered alloy pads 23 and 22 are pressed against a flywheel and a pressure plate (both not shown) in the clutch engaging operation, respectively. This elastic deformation provides a cushioning effect, so that a shock is reduced in the engaging operation.

As already described, the first sintered alloy pad 22 is fixed to the cushioning plate 21 by the rivets 32. In the above operation, the cushioning plate 21 elastically deforms and moves toward the driven plate 20, so that the cushioning plate 21 pushes the large shank portion 32b to move the rivet 32 toward the second sintered alloy pad 23 (leftward in FIG. 3). Therefore, the degree of cushioning is not restricted, and further the rear surfaces of the driven plates 20 and the cushioning plates 21 are entirely brought into contact with each other. Thus, the first and second sintered alloy pads 22 and 23 receive uniform loads on their entire surface, although the loads are exerted indirectly. Therefore, local wearing or abrasion associated with contact between rivets and adjacent cushioning plates can be reduced or prevented. Thus, resistance against wearing is improved.

Although the inner peripheral portion of the cushioning plate 21 is fixed by the rivets 24, a predetermined space is ensured between the small shank portion 32c of the rivet 32 and the inner periphery of the aperture 21c of the cushioning plate 21. Therefore, the cushioning plate 21 can smoothly deform and/or move radially outward when it elastically deforms.

When the friction engagement portion 3 is heated, the cushioning plates 21 thermally expand. However, the rivets 32 prevent axial movement of the cushioning plates 21 with respect to the driven plates 20. Therefore, strain or distortion due to thermal expansion can be suppressed.

According to the friction member and the clutch disk assembly of the invention, as described above, the cushioning plate having a corrugated form is disposed between the two sintered alloy pads opposed together. Therefore, the cushioning plate can elastically deform to reduce a shock in the clutch engaging operation. Since the second sintered alloy pad is fixed to the driven plate by partially bending the outer peripheral edge of the driven plate, a rivet for fixing the second sintered alloy pad is not required, so that a sufficiently large degree of cushioning can be ensured. Further, the first sintered alloy pad is fixed to the cushioning plate by the carrying member, which is movable in the direction of deformation of the cushioning plate. Therefore, the carrying member does not affect the cushioning effect. Accordingly, when engaging pressures are applied to the opposed sintered alloy pads, the rear surfaces of the cushioning plate and the driven plate are brought into contact with each other, and thus the entire rear surfaces of the opposed sintered alloy pads are indirectly and uniformly brought into contact with each other, so that the sintered alloy pads can have a uniform surface pressure distribution, and therefore can have an improved resistance against wearing.

In the structure where the driven plate is provided at its inner peripheral portion with the cut and bent portion, and the cut and bent portion is bent for fixing the second sintered alloy pad, the second sintered alloy pad can be fixed more positively to the driven plate.

Second Embodiment

Figure 4:
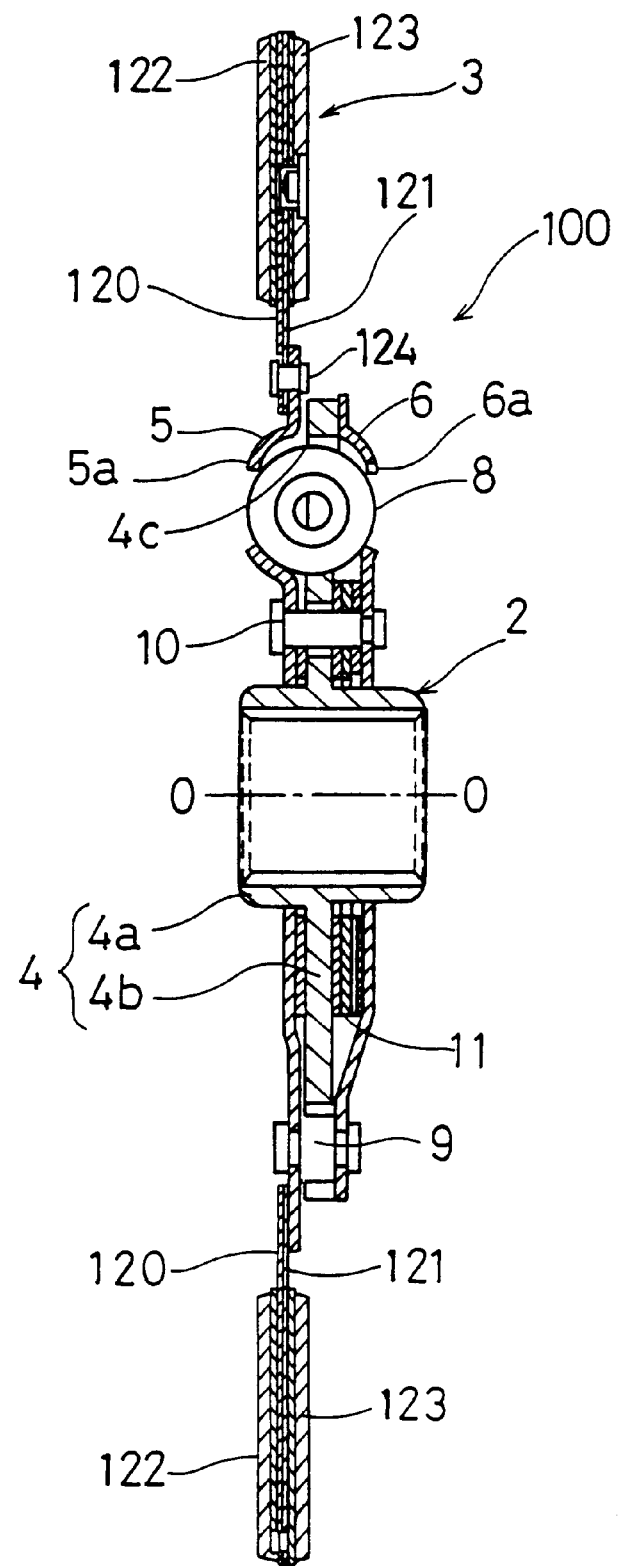
FIG. 4 is a cross sectional side view of a structure of a clutch disk assembly in accordance with a second embodiment of the present invention.

As shown in FIG. 4, a clutch disk assembly 100 in accordance with a second embodiment of the invention includes many elements similar to those previously described above with respect to the first embodiment, such as a main body 2 and a friction engagement portion 3.

At the center of the main body 2, there is arranged a spline hub 4 coupled to a shaft (not shown) of a transmission.

The spline hub 4 has a boss 4a and a flange 4b extending radially from the boss 4a. Input plates, i.e., a clutch plate 5 and a retaining plate 6 are arranged at opposite sides of the flange 4b. The clutch and retaining plates 5 and 6 are substantially annular, and are rotatably engaged with the outer periphery of the boss 4a. The flange 4b is provided at its radially middle portion with a plurality of windows 4c, in which torsion springs 8 are arranged, respectively. The torsion springs 8 elastically connects the clutch and retaining plates 5 and 6 to the spline hub 4 in the circumferential direction. The flange 4b is provided at its outer peripheral portion with recesses 4d which are circumferentially equally spaced from each other and each have a predetermined circumferential width. A stop pin 9 extends through each recess 4d. The stop pins 9 fix the clutch and retaining plates 5 and 6 together. A space is formed between each stop pin 9 and the edge of the corresponding recess 4d, so that the clutch and retaining plates 5 and 6 can rotate relatively to the spline hub 4 through a predetermined angle until the stop pins 9 are brought into contact with the edges of the recesses 4d.

A hysteresis torque generating mechanism 11 for generating a hysteresis torque is arranged between the inner peripheral portion of the flange 4b and each of the clutch and retaining plates 5 and 6.

The clutch and retaining plates 5 and 6 are provided at positions corresponding to the windows 4c of the flange 4b with cut and bent portions 5a and 6a which are bent and projected axially outward, respectively. The cut and bent portions 5a and 6a support the torsion springs 8 in the windows 4c.

The friction engagement portion 3 is arranged radially outside the clutch plate 5, and has a plurality of first cushioning plates 120, a plurality of second cushioning plates 121, and first and second sintered alloy pads 122 and 123 which are fixed to outer sides of the cushioning plates 120 and 121, respectively.

Figure 5:
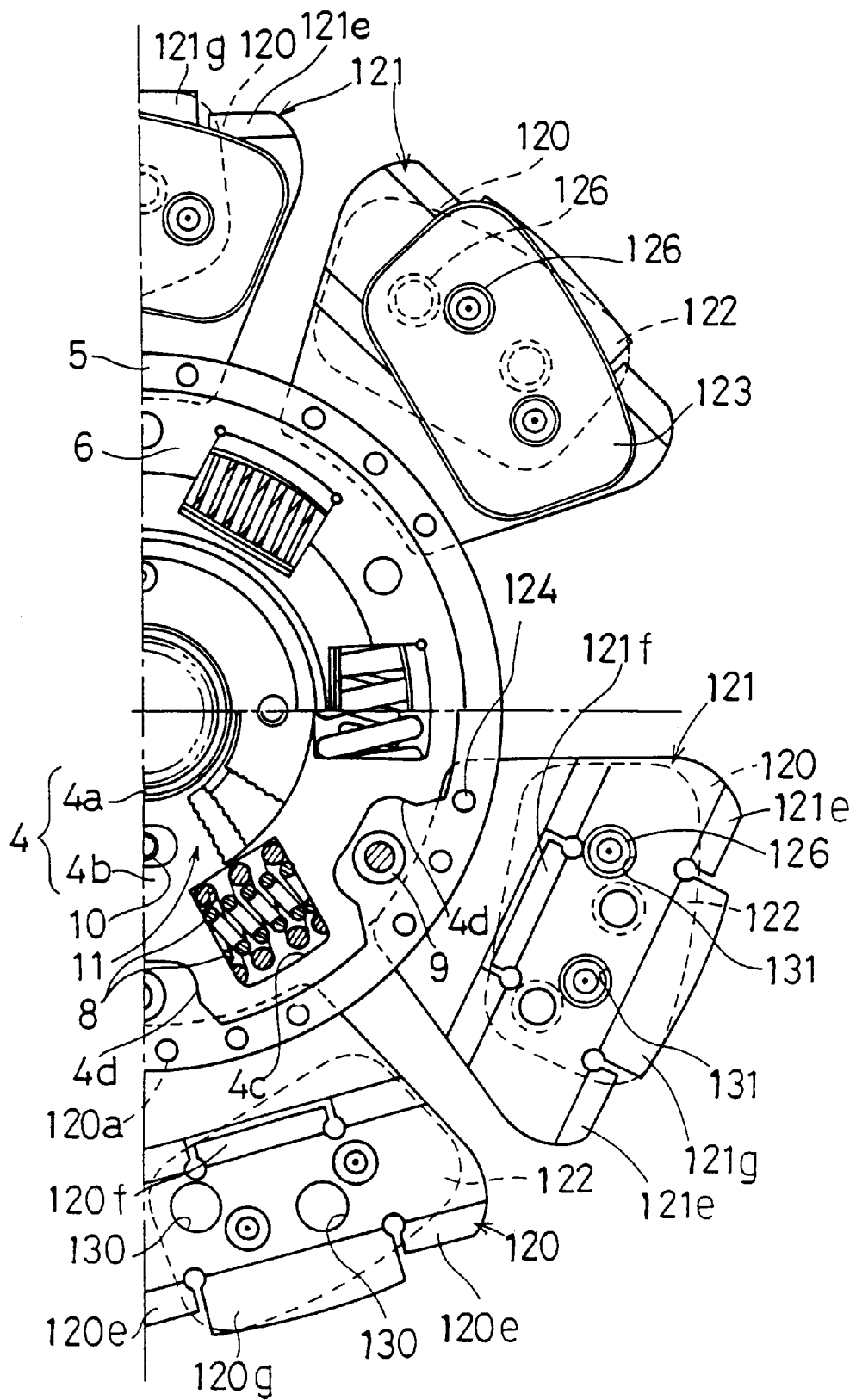
FIG. 5 is a fragmentary, part cross sectional, part elevational end view of the clutch disk assembly depicted in FIG. 4.
Figure 6:
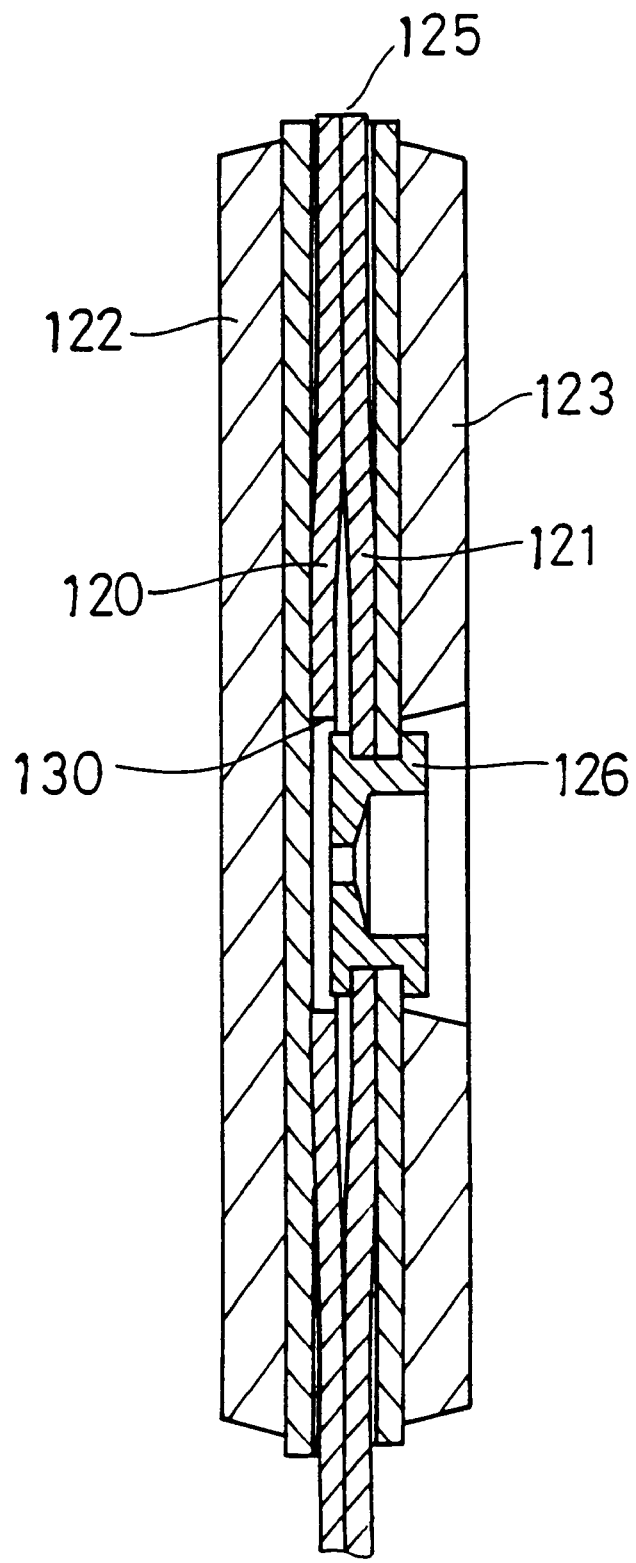
FIG. 6 is a fragmentary cross sectional view of a portion of FIG. 4, on an enlarged scale, showing details of the second embodiment of the present invention such as cushioning plates.

As shown in FIGS. 4 and 5, and FIG. 6 on an enlarged scale, the present invention includes machined portions of the cushioning plates 120 and 121, the cushioning plates 120 and 121 are made of plate members having corrugated or wavy radial sections. Further, in FIG. 7 the cushioning plates 120 and 121 are shown in an exaggerated manner with portions of the cushioning plates 120 and 121 stretched or drawn out axially to show the various portions thereof. The cushioning plates 120 and 121 have fixing portions 120a and 121a fixed to the outer peripheral portion of the clutch plate 5 by rivets 124, and cushioning portions 120b and 121b extending radially from the fixing portions 120a and 121a, respectively.

Figure 7:
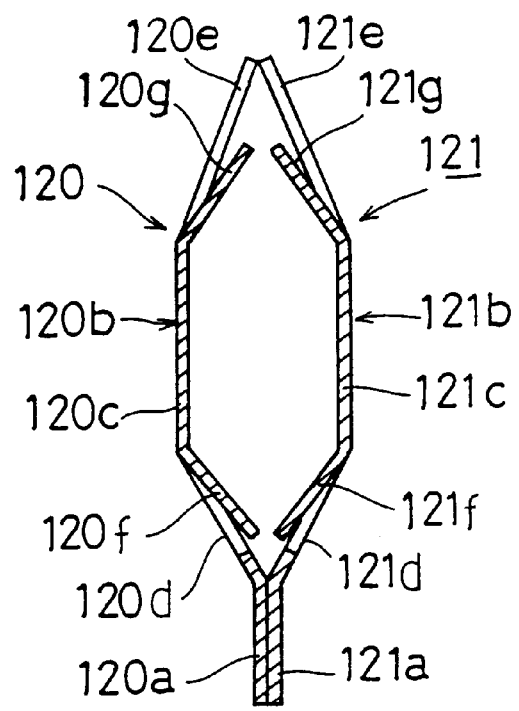
FIG. 7 is a distorted view of the cushioning plates depicted in FIG. 6, with the cushioning plates shown axially elongated in an exaggerated manner to demonstrate an aspect of the present invention.

The cushioning portions 120b and 121b are bent or machined to have corrugated forms in the radial sections as described above, and therefore are elastically deformable in the axial direction. The two cushioning plates 120 and 121 are fixed such that concavities of their corrugated portions are opposed to each other. The cushioning portions 120b and 121b have flat portions 120c and 121c on which the sintered alloy pads 122 and 123 are fixed, first inner bent portions 120d and 121d formed radially inside the flat portions 120c and 121c, and first outer bent portions 120e and 121e formed radially outside the flat portions 120c and 121c, respectively. As shown in FIGS. 5 and 7, each of the cushioning plates 120 and 121 further includes a second inner bent portion 120f or 121f, which is located between the first inner bent portions 120d or 121d, having a larger bent angle and a shorter axial length than the other portions, as well as a second outer bent portion 120g or 121g, which is located between the first outer bent portions 120e or 121e, having a larger bent angle and a shorter axial length than the other portions.

As can be seen from FIG. 7, when the cushioning plates 120 and 121 are not compressed (due to clutch disengagement), the ends of the first inner and outer bent portions 120d and 120e of the cushioning plate 120 are in contact with the ends of the first inner and outer bent portions 121d and 121e of the cushioning plate 121, respectively. However, as shown in FIG. 7, the ends of the second inner and outer bent portions 120f and 120g of the cushioning plate 120 are not in contact with the ends of the second inner and outer bent portions 121f and 121g of the cushioning plate 121, respectively when the cushioning plates 120 and 121 are not compressed. During the process of clutch engagement, the ends of the second inner and outer bent portions 120f and 120g of the cushioning plate 120 are brought into contact with the ends of the second inner and outer bent portions 121f and 121g of the cushioning plate 121, respectively, but only after both the cushioning plates 120 and 121 are compressed to a predetermined extent.

The first sintered alloy pad 122 is fixed to the flat portion 120c of each of the corrugated first cushioning plates 120 by rivets 126. Likewise, the second sintered alloy pad 123 is fixed to the flat portion 121c of each of the corrugated second cushioning plates 121 by rivets 126. The sintered alloy pads 122 and 123 are substantially rectangular, and more specifically have such structures that positions for the rivets fixing the first sintered alloy pad 122 to the first cushioning plate 120 do not overlap, in a plan view, with positions of the rivets fixing the second sintered alloy pad 122 to the second cushioning plate 121, as shown in FIG. 5. Further, one of the cushioning plates is provided with apertures 130 and 131 for avoiding interference with the heads of the rivets 126 which fix the sintered alloy pad to the other cushioning plate.

Owing to the above structure, interference between the rivets 126 and the cushioning plate, which restricts the degree of cushioning, does not occur even when the clutch disk is compressed.

According to the clutch disk assembly thus constructed, the cushioning plates 120 and 121 elastically deform when the sintered alloy pads 122 and 123 are pressed against a flywheel and a pressure plate (both not shown) in the clutch engaging operation, respectively. This elastic deformation provides a cushioning effect, so that a shock is reduced in the engaging operation. Both the cushioning plates 120 and 121 are in contact with each other at the ends of the first inner bent portions 120d and 121d and the ends of the first outer bent portions 120e and 121e, and other portions are spaced from each other. Therefore, elastic deformation of the cushioning plates 120 and 121 provide slow cushioning characteristics represented by portion (I) in FIG. 8, in which elastic deformation occurs only to a small extent. When both the cushioning plates 120 and 121 deform to a higher extent, the second inner bent portions 120f and 121f as well as the second outer bent portions 120g and 121g start deformation. This provides rapid cushioning characteristics at a portion (II) shown in FIG. 8.

Figure 8:
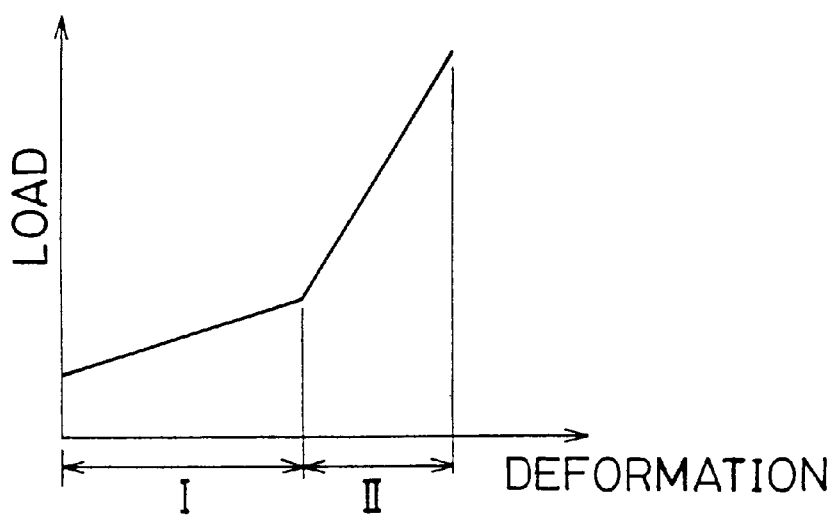
FIG. 8 is a graphical representation indicating the cushioning characteristics of the second embodiment of the present invention.

Since it is possible to provide the cushioning characteristics having two stages without difficulty, the characteristics at the portion (I) in FIG. 8 can be set for suppressing shudder, and the characteristics at the portion (II) can be set for suppressing noises.

Also, the positions of the rivets for fixing the sintered alloy pad 122 to the cushioning plate 120 do not overlap with those of the rivets for fixing the sintered alloy pad 123 to the cushioning plate 121. Further, each of the cushioning plates 120 and 121 are provided with the apertures 130 and 131 for preventing interference with the rivets 126. Therefore, the degree of cushioning is not restricted. Therefore, a shock, shudder and noises can be effectively prevented.

According to the clutch disk and the clutch disk assembly of the invention, as described above, since at least one of the first and second plate members carrying the friction members fixed thereto has a corrugated form for providing the cushioning characteristics having multiple stages, the cushioning characteristics in the first stage can be set, for example, to suppress the shudder, and the cushioning characteristics in the second stage can be set to suppress the noises.

In the structure where at least one of the first and second plate members is provided at its inner and outer peripheral portions with the inner and outer first bent portions bent toward the other plate, respectively, and is also provided at its inner and outer peripheral portions with the inner and outer second bent portions bent toward the other plate and each having axial lengths shorter than the first bent portions, the cushioning characteristics having two stages can be achieved by a simple structure.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A friction engagement assembly that is configured for attachment to an outer periphery of a clutch disk assembly, the friction engagement assembly comprising:

first and second plate members opposed to each other and including means for attachment to the outer periphery of the clutch disk assembly;

friction surface members fixed at outer surfaces of said first and second plate members such that at least one of said first and second plate members is corrugated to provide cushioning characteristics having multiple stages; and wherein said first plate member is provided at radially inner and outer peripheral portions with inner and outer first bent portions which engage said second plate, and said first plate member is also provided at said inner and outer peripheral portions with inner and outer second bent portions which extend toward said second plate and having axial lengths shorter than said first bent portions such that said second bent portions are spaced apart from said second plate and said second bent portions engage said second plate in response to limited axial movement toward said second plate and in response to further axial movement toward said second plate said second bent portions undergo elastic deformation.

2. The friction engagement assembly according to claim 1, wherein said second plate member is provided at inner and outer peripheral portions thereof with bent portions corresponding to said bent portions of said first plate member.

3. The friction engagement assembly according to claim 1, wherein said friction surface member is made of sintered metal material.

4. A clutch disc assembly, comprising:

a friction engagement assembly that includes first and second plate members opposed to each other, said first and second plate members being attached to an outer periphery of said clutch disk assembly;

friction surface members fixed at outer surfaces of said first and second plate members such that at least one of said first and second plate members is corrugated to provide cushioning characteristics having multiple stages; and wherein said first plate member is provided at radially inner and outer peripheral portions with inner and outer first bent portions which engage said second plate, and said first plate member is also provided at said inner and outer peripheral portions with inner and outer second bent portions which extend toward said second plate and having axial lengths shorter than said first bent portions such that said second bent portions are spaced apart from said second plate and said second bent portions engage said second plate in response to limited axial movement toward said second plate and in response to further axial movement toward said second plate said second bent portions undergo elastic deformation.

5. The clutch disc assembly according to claim 4, wherein said second plate member is provided at inner and outer peripheral portions thereof with bent portions corresponding to said bent portions of said first plate member.

6. The clutch disc assembly according to claim 4, wherein said friction surface member is made of sintered metal material.

7. The clutch disc assembly according to claim 4, farther comprising:

a central hub having a radially extending flange;

a pair of side plate members disposed on opposite axial sides of said range, at least one of said side plate members defining said outer periphery of said clutch disk assembly; and a damper mechanism operably disposed between said flange and said side plate members for dampening vibrations during relative rotation between said flange and said side plate members.

* * * * *